United States Patent Office 3,275,524
Patented Sept. 27, 1966

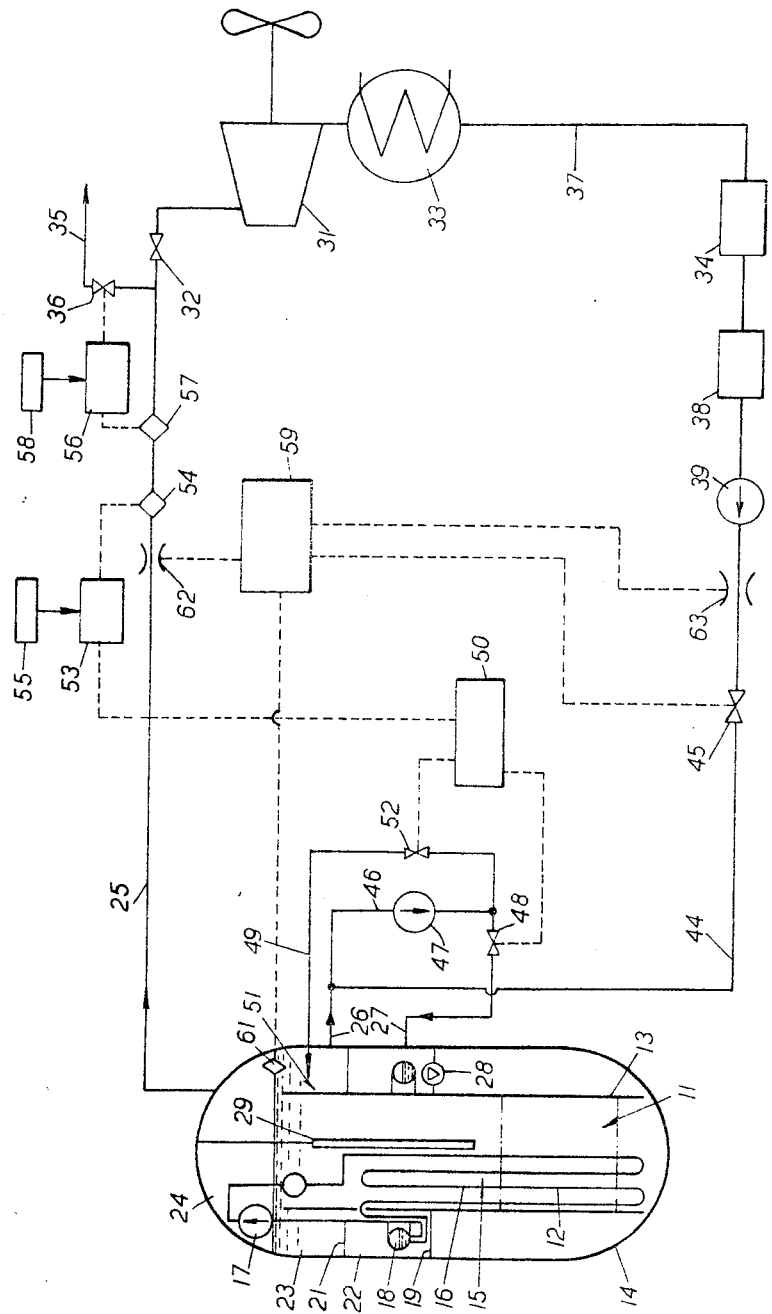

3,275,524
BOILING COOLANT REACTOR WITH IMPROVED RECIRCULATION AND BY-PASS CONTROL ARRANGEMENT
Ronald Peter Williams, Warrington, England, assignor to United Kingdom Atomic Energy Authority, London, England
Filed Dec. 26, 1963, Ser. No. 333,400
Claims priority, application Great Britain Jan. 8, 1963, 830/63
5 Claims. (Cl. 176—56)

This invention relates to nuclear reactors and is concerned with nuclear reactors in which the reactor coolant exists inside the reactor in both the liquid phase and the vapour phase when the reactor is in operation. Such reactors are termed boiling coolant reactors, the most common of these being the boiling water reactor at the present time.

A boiling water reactor has the characteristic that the water by which it is cooled also has a significant neutron moderating power, which is dependent upon the density of the water. For water of a given isotopic composition, the density is dependent upon the temperature and the voidage caused by the steam content of the water. Accordingly, if a boiling water reactor delivers steam directly to a steam turbine its reactivity is dependent upon the steam demand of the turbine. If the demand for steam increases, the pressure of the boiling water in the reactor decreases and more of the water flashes into vapour. The consequent reduction in water density (by increase of its steam content) reduces the neutron moderation in the reactor and hence reduces the reactivity of the reactor; the power level of the reactor drops accordingly. Thus the response of the reactor to an increase in steam demand is a decrease in power level. This response to steam demand is the opposite to that required to meet the demand.

In the United States "Experimental Boiling Water Reactor" (E.B.W.R.) which supplies steam directly to a turbine, this unwanted response to steam demand is met by maintaining the steam pressure at the reactor constant. The steam pressure at the turbine is varied by a by-pass valve in the steam line which discharges some of the steam to a condenser. The reactor generates a constant excess output of steam a fraction of which is discharged without use. The power level of the E.B.W.R. can be varied by conventional nuclear control rods but is not varied to meet temporary variations in steam demand. The output of excess steam tends to be uneconomical. Moreover, it is generally held to be desirable to reduce the number of conventional control rods in boiling water reactors, particularly those to be employed for marine propulsion.

One proposal for controlling the reactivity of a boiling water reactor without the use of control rods is embodied in the United States "Pathfinder" reactor. In this reactor the unevaporated portion of a boiling water coolant is recirculated forcibly by a recirculation pump. The rate of recirculation flow is varied by a butterfly valve in the recirculation line and by varying the speed of the recirculation pump. An increase in the recirculation flowrate reduces the steam content of the water coolant, thereby increasing neutron moderation and the reactivity of the reactor.

The present invention provides, in one of its aspects, a boiling coolant reactor having a recirculation line for forced recirculation of a liquid coolant through the reactor core at a rate which is variable to control the reactor power level wherein the recirculation rate is variable by means of a core by-pass line for carrying coolant from the recirculation line into heat exchange relationship with boiling coolant within the reactor to cause condensation therein and a valve to vary the flow of coolant through the by-pass line.

The present invention also provides, in another of its aspects, a boiling coolant reactor having a recirculation line for forced recirculation of liquid coolant at a rate which is variable to control the reactor power level wherein a core by-pass line from the recirculation line communicates with an injector to inject liquid coolant into boiling coolant within the reactor to cause condensation therein and wherein a valve in the by-pass line affords simultaneous control of the recirculation rate and of the rate of injection of liquid coolant into boiling coolant within the reactor. It is preferred that the temperature of the coolant in the recirculation line is lowered by mixture with low temperature feed coolant, such as coolant which has been evaporated, utilised in a turbine and condensed for return to the reactor.

The invention further provides a method of controlling a boiling coolant reactor having a recirculation line for forced recirculation of liquid coolant comprising varying the coolant recirculation rate to control the reactor power level by discharging coolant at a variable rate from the recirculation line into boiling coolant within the reactor to cause condensation therein.

It will be appreciated that this invention is limited in its application to those boiling coolant reactors which are amenable to reactivity control by variation of the coolant voidage. With reactivity control of this kind care must be taken to ensure that increased coolant voidage does not introduce a risk that fuel elements in the reactor may be locally overheated at surface areas lacking contact with liquid coolant, such condition being termed "burn-out." In order to avoid the "burn-out" condition, the degree of reactivity control afforded by variation of coolant voidage in the Pathfinder reactor stands to be severely limited. On the other hand coolant voidage control of reactivity can be secured over the full reactor power range in a reactor system as set forth in U.S. Patent Nos. 3,184,391 and 3,175,954, respectively, to S. Hackney and R. Potter. In this reactor pressurised water primary coolant is interposed as a layer between fuel elements and a boiling water secondary coolant. The conditions of the secondary coolant can be varied without altering the immediate cooling environment of the fuel elements. Furthermore, the presence in the reactor of a quantity of liquid primary coolant affords a degree of moderation in the reactor which is not affected by the conditions of the secondary coolant, a factor which contributes to the stability of the reactor.

One form of nuclear plant having a reactor embodying the invention will now be described by way of example with reference to the accompanying drawing which shows diagrammatically a boiling water nuclear reactor coupled to a steam turbine and an associated control system.

Nuclear plant

The boiling water reactor to which reference is now made is one form of a reactor more fully described in the aforementioned Patent No. 3,175,954. In this reactor a core 11 has fuel elements housed in fuel tubes 12 through which pressurised light water is circulated as a primary coolant. The fuel tubes are clustered in a core region defined by a baffle 13, this assembly being housed in the lower part of a reactor vessel 14. A secondary coolant, also light water, is circulated downwards through the annular space between the reactor vessel and the baffle and upwardly through the core between the fuel tubes. Neutron moderation in the reactor is effected by the primary and secondary coolants.

The baffle 13 extends upwards beyond the core region 11 to define a heat transfer region 15 in which are clustered unfuelled extension tubes 16, each extension tube 16 being a continuation of a fuel tube 12. The fuel tubes and extension tubes are connected in a serpentine fashion to provide a series of flowpaths for the primary coolant, of which only one flowpath is shown. The primary coolant is circulated through these flowpaths by circulators 17 and is pressurised by a toroidal pressuriser 18. Surrounding the heat transfer region 15, the annular space between the baffle 13 and the reactor vessel 14 is divided by annular partitions 19 and 21 into a pressuriser chamber 22 and a steam separation chamber 23.

In its upward passage through the core and the heat transfer region the secondary coolant is allowed to boil to form a mixture of steam and water which is separated by suitable equipment, such as cyclones (not shown), in the separation chamber 23. The separated steam is collected in a steam dome 24, scrubbed, and delivered through a steam pipe 25. Unevaporated water is discharged through outlets 26 to be recirculated and delivered through inlets 27 into the pressuriser chamber 22 from which it flows downwardly through non-return valves 28 in the partition 19. Neutron-absorbing control rods 29 are provided for control of the core reactivity during such operations as starting up the reactor and shutting the reactor down under normal conditions or in an emergency. These control rods are not required to produce variations in the reactor power level during operation and may, therefore, be of limited size and number.

As shown the reactor is directly coupled by the steam pipe 25 to a steam turbine 31 for marine propulsion; a turbine control valve 32 in the steam pipe enables the power output of the turbine to be varied. Upstream of the valve 32, a steam by-pass line 35 with a valve 36 enables steam from the pipe 25 to be discharged to a dumping facility (not shown) for example a dump condenser. The steam output from the turbine is delivered to a steam condenser 33 from which condensed water is delivered through line 37 to feed heaters 34 and a feed de-aerator 38. A pump 39 delivers feed water from the feed heaters 34 and the feed de-aerator 38 through a feed line 44 fitted with a feed control valve 45. Although preheated in the feed heaters 34 and the de-aerator 38 the feed water in the line 44 termed low temperature feed coolant is at a substantially constant temperature below the temperaure of the secondary coolant discharged from the reactor steam separation chamber 23 through the outlets 26.

The unevaporated secondary coolant in the reactor is recirculated through a recirculation line 46 which connects the outlets 26 with the inlets 27. This recirculation line 46 is fitted with a pump 47 of the centrifugal type, which operates at a substantially constant speed, and a throttle 48. The feed water line 44 delivers feed water into the recirculation line at a point upstream of the pump 47. It is a feature of the reactor system that the feed coolant is mixed with the recirculating coolant upstream of the pump 47 so that the coolant at the pump has been cooled below the coolant saturation temperature by this mixing, thus reducing the possibility of pump cavitation. Downstream of the pump, a core by-pass line 49 abstracts secondary coolant from the recirculation line and delivers it into the steam separation chamber 23 of the reactor through a nozzle 51 adapted to inject the coolant in a dispersed manner, into the boiling coolant not far from the upper limit of the boiling coolant region in the reactor; a valve 52 it fitted in the by-pass line 49.

It is to be understood that, although in the system now described coolant from the recirculation line is injected into the steam separation chamber 23, the coolant could also be injected into the boiling coolant in the central region above the heat transfer region 15. The core by-pass coolant is to be injected into boiling coolant within the reactor and for the purposes of the present invention boiling coolant is defined as coolant at saturation temperature in which the liquid and vapour phases of the coolant are in equilibrium. As a consequence, the injection of coolant at a temperature less than saturation temperature into boiling coolant does not lower the temperature of the boiling coolant but causes condensation and thus reduces the steam content of the boiling coolant.

For operational control purposes, a power level controller 50 is linked with the valves 48 and 52 which are opened and closed by the controller. The power level controller operates the valves in accordance with a signal received from a steam pressure comparator 53 which derives the signal by a comparison of the steam pressure in the line 25 as measured by a transducer 54 and a pre-selected operational steam pressure pre-set at a control unit 55. A pressure relief unit is constituted by a second steam pressure comparator 56 which operates the by-pass valve 36 in accordance with a comparison between the steam pressure in the line 25 as measured by a transducer 57 and a pre-selected maximum steam pressure pre-set at a control unit 58. Finally a feed water flow controller 59 controls the feed water valve 45 in accordance with signals received from a reactor water level indicator 61, a flowmeter 62 to indicate steam flow in the line 25, and a flowmeter 63 to indicate feed water flow in line 44.

Operational control

An increase in the power output of the turbine must be matched by an increase in the power level of the reactor with a consequent increase in the reactor steam output. In practice the turbine power output is adjusted by means of the turbine control valve 32, and the power level controller 50 causes the reactor power level to follow variations in the turbine power output in such a manner that the steam pressure in the steam line 25 and in the reactor steam dome 24 is maintained substantially constant.

The power level of a boiling water reactor such as that described can be raised by operating on the density of the coolant, in this case by varying the steam content of the secondary coolant. At a steady power level the reactor has zero reactivity (dk./k.) and a steady level of neutron flux. To increase the reactor power level the steam content of the secondary coolant is lowered thus increasing the neutron moderation in the reactor and causng the reactor to diverge with a positive reactivity. As the reactor nutron flux, and thus the reactor power level, rise the heat produced by the reactor rises and consequently the steam content of the secondary coolant rises. At a certain higher power level the steam content has risen to a value (close to the initial value) such that the reactivtiy of the reactor again becomes zero and the reactor power level becomes steady once more. Since the steam output of the reactor was not lowered to lower the steam content of the secondary coolant, but rather was the recirculation rate of the secondary coolant raised, the result of raising the reactor power level is to raise the reactor steam output.

The rise in heat output of the reactor as the power level rises introduces other effects on the reactivity of the reactor due to the rise in the temperatures of the fuel elements and the primary coolant. The combined temperature coefficient of reactivity of the fuel elements and the primary coolant is negative. As a consequence the reactor power level steadies out when the steam content of the secondary coolant is somewhat lower at the higher power level than at the lower power level. Similarly as the power level of the reactor is lowered the steady state steam content of the secondary coolant rises.

As has been pointed out already, the steam content of the secondary coolant in the reactor can be varied by varying the secondary coolant recirculation rate; an increase in the recirculation rate reduces the steam content. In the present system the recirculation rate can be varied by means of the valve 48 or the by-pass valve 52, while the circulating pump 47, continues operating at substantially constant rates. Assuming that the valve 52 is held closed, it can be shown that, if the valve 48 is employed to lower the recirculation rate of the secondary coolant and so to lower the power level of the reactor, the necessary rise in the steady state steam content of the secondary coolant at the lower power level is accompanied by a reduction in the enthalpy of the secondary coolant at the inlet 27. This reduction in secondary coolant inlet enthalpy implies a reduction of the steam content of the secondary coolant. Since this effect opposes the desired rise in the steam content, it must be overcome by a further reduction in the secondary coolant flow rate.

It is found that if the valve 48 is employed alone for reactor power level control as described above, a 90% reduction in the recirculation rate of the secondary coolant at full power is required to reduce the power level of the reactor from full power by about 70%. It is considered that the secondary coolant recirculation rate cannot be reduced by more than 90% without introducing instabilities into the operation of the reactor. As a consequence it is seen that the full power range of the reactor cannot be utilised if power level control is effected only by means of the valve 48 with the by-pass valve 52 closed.

Power level control of the reactor is achieved by means of the by-pass valve 52 which varies the recirculation rate by permitting more or less of the recirculating coolant to flow through the by-pass line 49 into boiling coolant within the reactor. It can be shown that if by-pass valve 52 is employed to lower the recirculation rate of the secondary coolant and so to lower the power level of the reactor, the necessary rise in the steady state steam content of the secondary coolant at the lower power level is accompanied by an increase in the enthalpy of the secondary coolant at the inlet 27. This increase in secondary coolant inlet enthalpy implies an increase in the steam content of the secondary coolant. This effect contrasts with the opposing effect resulting from use of the valve 48 alone, so much so that, for a given circulation rate, it causes an excess generation of steam in the reactor core and the heat transfer region.

However, control of the recirculation rate by means of the by-pass valve 52 is accompanied by a corresponding injection of secondary coolant, which has been cooled by mixing with feed coolant, into boiling coolant within the reactor. As the recirculation rate is lowered so the rate of coolant injection is raised, with the result that the excess steam generation in the reactor core and heat transfer region at lower recirculation rates is matched by equivalent amounts of steam condensed in the boiling coolant in the reactor at higher rates of coolant injection.

It is found that if the by-pass valve 52 is employed for reactor power level control as described above, a 90% reduction in the recirculation rate of the secondary coolant at full power reduces the power level of the reactor from full power by about 90%. It will be understood that auxiliary apparatus such as the circulating pumps are powered by means of steam drawn from the steam pipe 25 through lines which are not shown in the drawing; it is anticipated that this auxiliary apparatus applies a continuous load equivalent to approximately 10% reactor power level. Accordingly the full power range of the reactor is used to good advantage notwithstanding the limitation to a 90% reduction in the secondary coolant recirculation rate. The by-pass valve 52 is, therefore, used for operational control of the reactor power level and is actuated by the power level controller 50 in such a manner that the steam pressure at the reactor is maintained substantially constant. Thus the controller 50 causes the power level of the reactor to follow variations in turbine power output. The pressure relief unit incorporating the comparator 56 ensures that the pressure in the steam pipe is limited to a preselected maximum value if the turbine control valve is closed too quickly for the controller 50 to follow the consequent rise in steam pressure.

It is to be understood that the invention is not limited to the details of the foregoing example. Thus, provided the by-pass valve 52 is open, control of the secondary coolant recirculation rate may be achieved in accordance with the invention by means of the throttle 48, the valve 52 and the throttle 48 being arranged in a parallel relationship.

I claim:

1. In a boiling coolant nuclear reactor having a nuclear core with a coolant inlet, a chamber to receive boiling coolant from the core, and a recirculation line including a circulator and connecting the boiling coolant chamber to the core coolant inlet for forced recirculation of liquid coolant from the chamber back to the core, the improvement, for varying the recirculation, comprising a by-pass line directly connecting the recirculation line at a point downstream of the circulator to the boiling coolant chamber for passing recirculating coolant from the recirculation line to the boiling coolant chamber, and means to vary controllably the flow rate in the by-pass line.

2. Apparatus according to claim 1, further comprising a feed coolant line connected to the recirculation line upstream of the circulator for adding a make-up supply of coolant.

3. Apparatus according to claim 2, wherein the means to vary controllably the flow rate in the by-pass line comprises a flow control valve in said line and a control unit to adjust said valve in accordance with variations in pressure in a line adapted for delivering vapor coolant from the boiling coolant chamber to a turbine.

4. A boiling coolant nuclear reactor comprising a nuclear core, fuel elements in the core, fuel tubes housing the fuel elements, pressurized coolant within the fuel tubes, boiling coolant surrounding the fuel tubes in its passage through the core, a coolant inlet to the core, a chamber to receive boiling coolant from the core, a coolant vapor delivery pipe from the chamber for conveying coolant vapor therefrom, a liquid coolant recirculation line connected to conduct liquid coolant from the boiling coolant chamber back to the coolant inlet, a feed coolant line connected to the recirculation line, a circulator in the recirculation line downstream of the feed coolant line, a liquid coolant injector in the boiling coolant chamber, a core by-pass line connected between the injector and the recirculation line downstream of the circulator for passing recirculating coolant from the recirculation line to the injector in the boiling coolant chamber, and a flow control valve in the by-pass line to afford simultaneous control of the coolant recirculation rate and the rate of injection of liquid coolant into the boiling coolant chamber.

5. A boiling coolant nuclear reactor as claimed in claim 4 wherein the pressurized and boiling coolants are water.

References Cited by the Examiner

UNITED STATES PATENTS

| | | | |
|---|---|---|---|
| 2,861,033 | 11/1958 | Treshow | 176—56 |
| 3,029,197 | 4/1962 | Untermeyer | 176—55 |
| 3,034,977 | 5/1962 | Holl et al. | 176—54 |
| 3,132,999 | 5/1964 | Linsenmeyer | 176—54 |
| 3,150,052 | 9/1964 | Stoker et al. | 176—54 |
| 3,167,480 | 1/1965 | West et al. | 176—56 |
| 3,175,954 | 3/1965 | Potter | 176—54 |

OTHER REFERENCES

Nucleonics, vol. 13, No. 12, December 1955, p. 45.

L. DEWAYNE RUTLEDGE, *Primary Examiner.*